United States Patent
Kollar et al.

(10) Patent No.: US 9,328,838 B2
(45) Date of Patent: May 3, 2016

(54) PLUG ASSEMBLY FOR OPENING AND CLOSING A DRAIN HOLE

(71) Applicant: GM GLOBAL TECHNOLOGY OPERATIONS LLC, Detroit, MI (US)

(72) Inventors: Craig A. Kollar, Sterling Heights, MI (US); Xiujie Gao, Troy, MI (US); Paul W. Alexander, Ypsilanti, MI (US); Nancy L. Johnson, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/664,504

(22) Filed: Mar. 20, 2015

(65) Prior Publication Data
US 2015/0192215 A1 Jul. 9, 2015

Related U.S. Application Data

(62) Division of application No. 12/913,224, filed on Oct. 27, 2010, now Pat. No. 9,038,983.

(51) Int. Cl.
*F16K 31/02* (2006.01)

(52) U.S. Cl.
CPC .................................. *F16K 31/025* (2013.01)

(58) Field of Classification Search
CPC ..... F16K 31/002; F16K 31/065; F03G 7/065; G05D 23/1921
USPC ............... 251/11, 68, 75, 294, 318, 336–337, 251/368; 137/62, 79, 354
See application file for complete search history.

(56) References Cited

U.S. PATENT DOCUMENTS

| 7,260,932 B1 * | 8/2007 | Klimowicz ............. F16K 7/045 60/527 |
| 2010/0108922 A1 * | 5/2010 | Foshansky ............ F16K 31/025 251/129.01 |

* cited by examiner

*Primary Examiner* — Marina Tietjen
(74) *Attorney, Agent, or Firm* — John A. Miller; Miller IP Group, PLC

(57) ABSTRACT

A drain plug assembly that has particular application for sealing a drain hole in a battery compartment on a vehicle. The plug assembly includes a plug that inserted into the drain hole and a cover covering the plug. The plug assembly also includes a first shape memory alloy (SMA) wire having ends attached to the cover and a middle portion attached to the plug and a second SMA wire having ends attached to the cover and a middle portion attached to the plug. The plug assembly also includes a mechanical hinge attached to the plug and the cover, wherein the first SMA wire is actuated to flip the hinge to position the plug in a closed position to close the drain hole and the second SMA wire is actuated to flip the hinge to position the plug in an open position to open the drain hole.

17 Claims, 5 Drawing Sheets

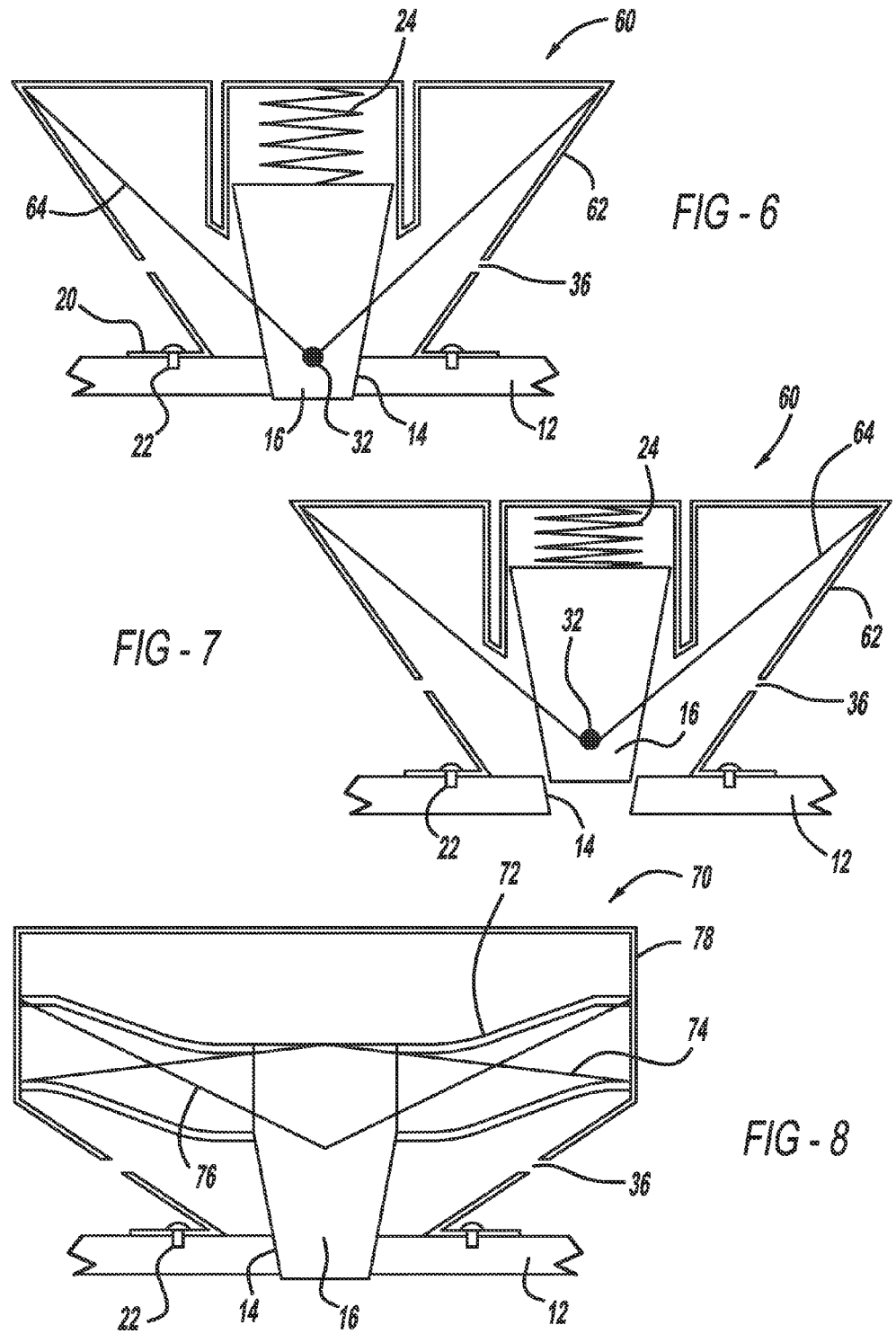

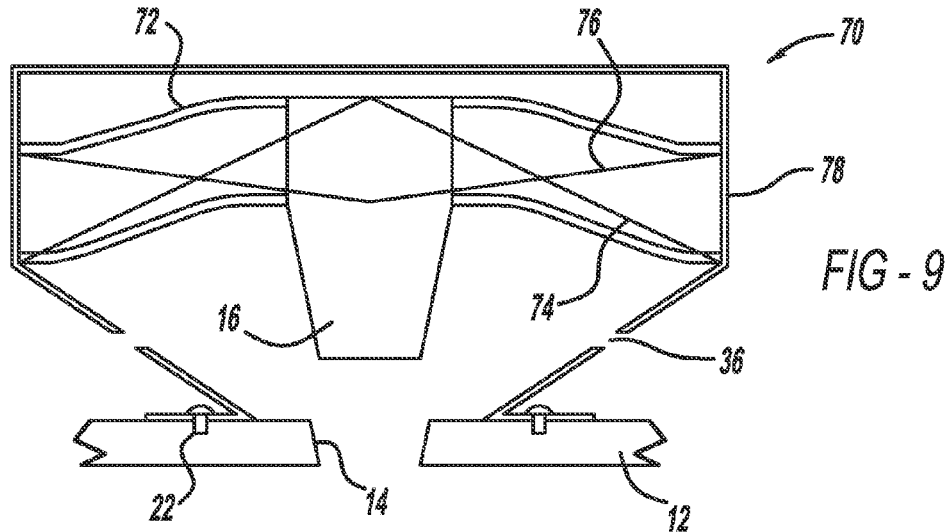
FIG - 9
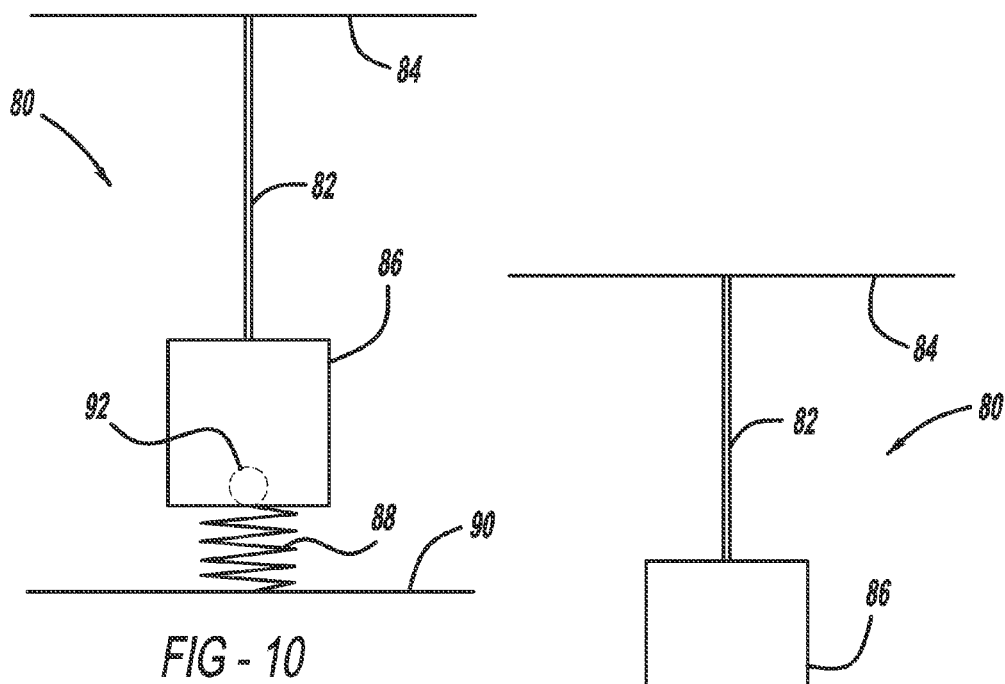
FIG - 10
FIG - 11

PLUG ASSEMBLY FOR OPENING AND CLOSING A DRAIN HOLE

CROSS-REFERENCE TO RELATED APPLICATIONS

This application is a Divisional application of U.S. patent application Ser. No. 12/913,224, filed Oct. 27, 2010, titled "Active Drain Plug for High Voltage Battery Applications".

BACKGROUND OF THE INVENTION

1. Field of the Invention

This invention relates generally to a drain plug for an enclosure and, more particularly, to a drain plug assembly for a battery enclosure that employs a shape memory alloy (SMA) device for actuating the drain plug.

2. Discussion of the Related Art

Electric vehicles are becoming more and more prevalent. These vehicles include hybrid vehicles, such as the extended range electric vehicles (EREV) that combine a battery and a main power source, such as an internal combustion engine, fuel cell systems, etc., and electric only vehicles, such as the battery electric vehicles (BEV). All of these types of electric vehicles employ a high voltage battery that includes a number of battery cells. These batteries can be different battery types, such as lithium ion, nickel metal hydride, lead acid, etc. A typical high voltage battery system for an electric vehicle may include a large number of battery cells or modules including several battery cells to meet the vehicle power and energy requirements.

The high voltage battery on an electric vehicle is typically mounted to a support member and covered with a suitable protective cover that provides a number of functions. For example, the cover is a protective cover in that it prevents the battery cells from being damaged as a result of collision with other objects. Further, the cover provides electrical insulation from the high voltage of the battery to protect individuals and users.

Various sources may cause fluids to accumulate within the battery enclosure. Because the vehicle battery is a high voltage battery, it is desirable to remove or drain any fluids that may have accumulated in the enclosure. In order to provide this drainage, the lower support structure on which the battery pack is mounted typically includes a drain plug that is inserted into an opening in the wall of the enclosure, which can be removed to drain the fluid that accumulates in the enclosure. For example, it is known in the art to provide a flexible plug in a drain hole that is provided at a desirable location in the battery pack enclosure. In one design, the drain hole is about 20 mm in diameter.

Because of the high voltage environment, it is typically necessary that any fluid that has accumulated in the battery enclosure that requires the plug be removed be performed by a trained service technician where the vehicle needs to be taken to a reputable service center. Further, it is sometimes difficult to know if fluid has accumulated in the battery enclosure, requiring such a trip to the service center. Also, the known plugs that are inserted into the drain hole of the battery enclosure often times leak themselves where water from driving through a wet environment may enter the enclosure through the drain hole around the plug.

SUMMARY OF THE INVENTION

The present disclosure describes a drain plug assembly that has particular application for sealing a drain hole in a high voltage battery compartment on a vehicle. The plug assembly includes a plug that is inserted into the drain hole and a cover covering the plug. The plug assembly also includes a first shape memory alloy (SMA) wire having a first end attached to one side of the cover, a second end attached to an opposite side of the cover and a middle portion attached to the plug, and a second SMA wire having a first end attached to one side of the cover, a second end attached to an opposite side of the cover and a middle portion attached to the plug. The plug assembly also a mechanical hinge attached to the plug and the cover, where the first SMA wire is actuated to flip the hinge to position the plug in a closed position to close the drain hole and the second SMA wire is actuated to flip the hinge to position the plug in an open position to open the drain hole, and where the first and second SMA wires are actuated by applying a current to the wires.

Additional features of the present invention will become apparent from the following description and appended claims, taken in conjunction with the accompanying drawings.

BRIEF DESCRIPTION OF THE DRAWINGS

FIG. 6 is a side plan view of another plug assembly for sealing a drain hole where the plug is in the closed position;

FIG. 7 is side plan view of the plug assembly shown in FIG. 6 where the plug is in the open position;

FIG. 8 is a side plan view of another plug assembly for sealing a drain hole where the plug is the closed position;

FIG. 9 is a side plan view of the plug assembly shown in FIG. 8 where the plug is in the open position;

FIG. 10 is a side plan view of another plug assembly for sealing a drain hole where the plug is in the closed position;

FIG. 11 is a side plan view of the plug assembly shown in FIG. 10 where the plug is in the open position;

DETAILED DESCRIPTION OF THE EMBODIMENTS

The following discussion of the embodiments of the invention directed to a plug assembly for sealing a drain hole, where the plug assembly employs an SMA device, is merely exemplary in nature, and is in no way intended to limit the invention or its application or uses. For example, the plug assembly of the invention has particular application for sealing a drain hole in a high voltage battery enclosure on a vehicle. However, as will be appreciated by those skilled in the art, the plug assembly of the invention may have other applications, such as boat hulls.

Figure 1:
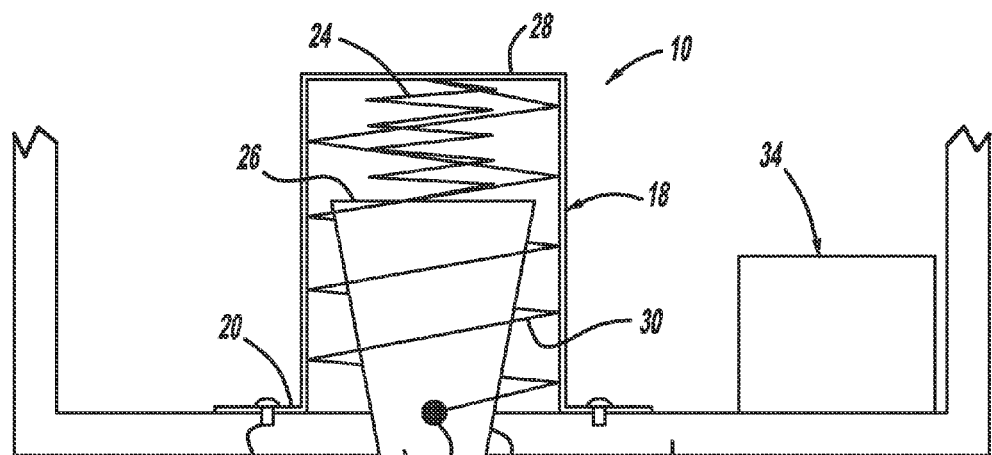
FIG. 1 is a side plan view of a plug assembly for sealing a drain hole where the plug is in the closed position.
Figure 2:
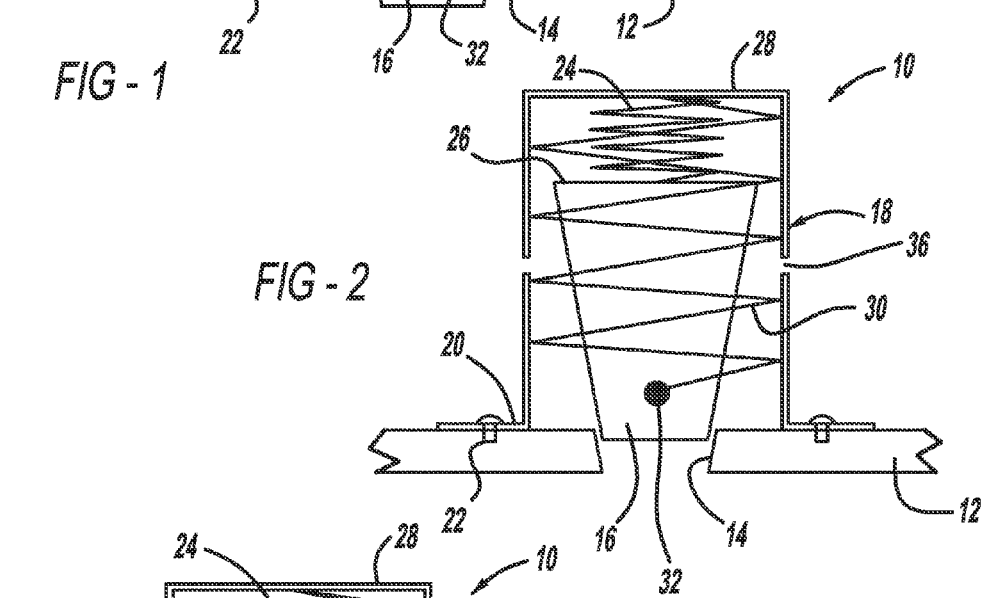
FIG. 2 is a side plan view of the plug assembly shown in FIG. 1 where the plug in the open position.

FIG. 1 is a side plan view of a plug assembly 10 mounted to a wall 12 having a drain hole 14. In the non-limiting embodiment being discussed herein, the wall 12 is a bottom plate, or other suitable structure, of an enclosure for a high voltage battery 34 on a vehicle. The plug assembly 10 includes a plug 16, shown in the closed position, that is made of suitable resilient material and appropriately shaped to fit within the drain hole 14 to provide a suitable seal. FIG. 2 is a side plan view of the plug assembly 10 where the plug 16 is shown in the open position to remove fluids from the enclosure. The drain hole 14 and the plug 16 have a corresponding conical shape so that when the plug 16 is inserted into the drain hole 14 it conforms to the shape of the hole 14 to provide the desired sealing. Further, the shape of the plug 16 and the drain hole 14 allows the plug 16 to provide a self centering feature within the hole 14 so that the plug 16 is properly aligned in the hole 14. Further, as the plug 16 wears over time, it's conically shape allows it to sink deeper into the hole 14 to continue to provide the desired sealing.

The plug assembly 10 also includes an outer cover 18 having an edge flange 20 that is mounted to an inside surface of the wall 12 by suitable bolts 22. The cover 18 includes suitable openings, slots, holes, etc., represented generally by reference number 36, that allow fluid that accumulates within the enclosure to flow through the cover 18 and out of the drain hole 14.

The plug assembly 10 also includes a helical return spring 24 having one end mounted to, or in contact with, a top end 26 of the plug 16 and opposite end mounted to, or in contact with, a top plate 28 of the housing 18. The plug assembly 10 also includes a helical wound shape memory alloy (SMA) device 30 having a first end mounted to an attachment point 32 at an end of the plug 16 proximate the hole 14 and an opposite end mounted to, or in contact with, the top plate 28 so that the plug 16 is generally positioned within the SMA device 30, as shown. The SMA device 30 is made of a suitable shape memory alloy, discussed in more detail below, that performs the desired function discussed herein.

Shape memory alloys are well known to those skilled in the art and provide a number of desirable features. Suitable shape memory alloy materials include nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in shape orientation, damping capacity, and the like. For example, a nickel-titanium based alloy is commercially available under the trademark NITINOL from Shape Memory Applications, Inc.

Shape memory alloys exhibit a one-way shape memory effect, an intrinsic two-way effect, or an extrinsic two-way shape memory effect depending on the alloy composition and processing history. The two phases that occur in shape memory alloys are often referred to as martensite and austenite phases. The martensite phase is a relatively soft and easily deformable phase of the shape memory alloys, which generally exists at lower temperatures. The austenite phase, the stronger phase of shape memory alloys, occurs at higher temperatures. Shape memory materials formed from shape memory alloy compositions that exhibit one-way shape memory effects do not automatically reform, and depending on the shape memory material design, will likely require an external mechanical force to reform the shape orientation that was previously exhibited. Shape memory materials that exhibit an intrinsic shape memory effect are fabricated from a shape memory alloy composition that will automatically reform themselves.

The temperature at which the shape memory alloy remembers its high temperature form when heated can be adjusted by slight changes in the composition of the alloy and through heat treatment. In nickel-titanium shape memory alloys, for example, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing the shape memory material with shape memory effects as well as high damping capacity. The inherent high damping capacity of the shape memory alloys can be used to further increase the energy absorbing properties.

In this embodiment, an electrical current is applied to the SMA device 30 to cause it to change its state as a result of the heat generated therein. When the current is applied, the SMA device 30 contracts against the bias of the return spring 24 so that the plug 16 is drawn up into the cover 18 and out of the drain hole 14, as shown in FIG. 2. A discussion of when the control for the plug assembly 10 performs this operation will be provided below.

Figure 3:
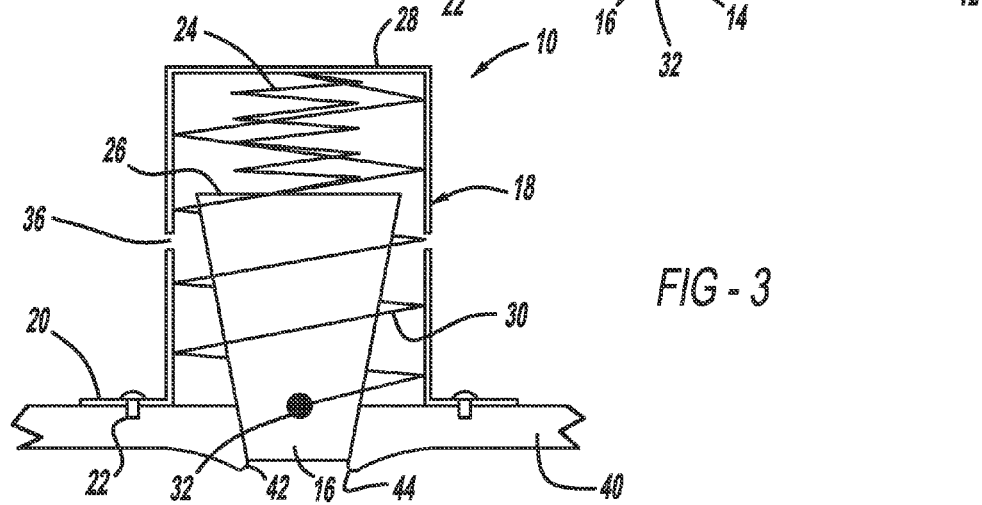
FIG. 3 is a side plan view of the plug assembly shown in FIG. 1 where the drain hole includes an anti-splash guard feature.

It is possible that dirt, mud and other debris from the road way may enter and clog the drain hole 14 and limit the fluid flow from the enclosure through the hole 14. Further, obstacles hitting the plug 16 can cause it to lift up out of the hole 14 against the bias of the spring 24, thus allowing water or other fluids to enter the enclosure through the hole 14. In order to help prevent these detrimental effects from occurring, the wall 12 can be modified. FIG. 3 is a side plan view of the plug assembly 10 being used in an enclosure having a wall 40 with a drain hole 42 that has been modified to include an annular feature 44. The feature 44 extends down from the plug 16 and prevents obstacles and debris from hitting the plug 16.

Figure 4:
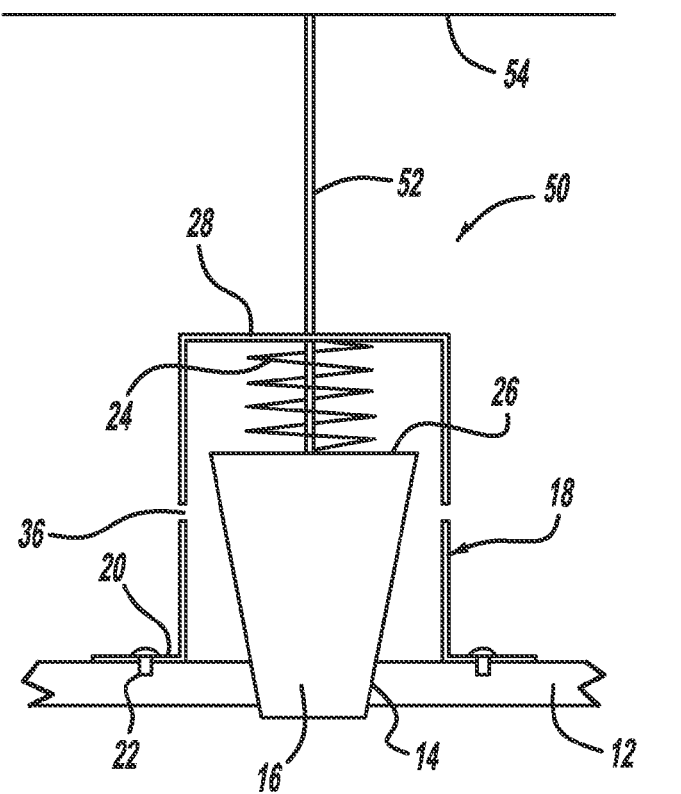
FIG. 4 is a side plan view of another plug assembly for sealing a drain hole where the plug is in the closed position.
Figure 5:
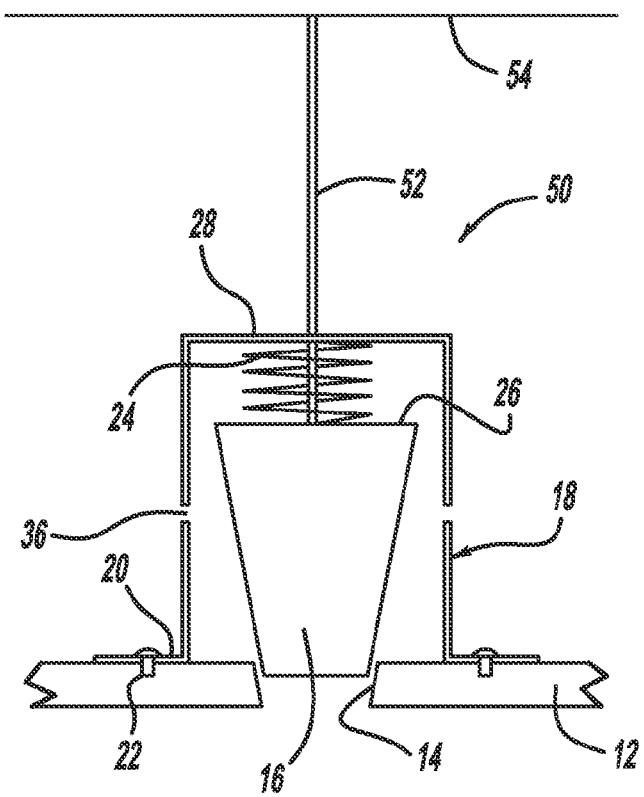
FIG. 5 is a side plan view of the plug assembly shown in FIG. 4 where the plug in the open position.

The helical wound SMA device 30 in the plug assembly 10 is one non-limiting embodiment for providing an SMA actuated plug. FIG. 4 is a side plan view of a plug assembly 50 similar to the plug assembly 10, where like elements are defined by the same reference number, and where the plug 16 is in the closed position. FIG. 5 is a side plan view of the plug assembly 50 where the plug 16 is in the open position. In this design, the helical wound SMA device 30 has been replaced with a straight wire SMA device 52 that has one end attached to the top surface 26 of the plug 16 and an opposite end attached to a mounting plate 54. The mounting plate 54 may or may not be within the battery enclosure. As above, when the SMA device 52 is heated, it contracts and shortens its length, which pulls the plug 16 up against the bias of the spring 24 to open the drain hole 14, as shown in FIG. 5.

FIG. 6 is a side plan view of a plug assembly 60 similar to the plug assembly 10, where like elements are identified by the same reference numeral, and where the plug 16 is in the closed position. FIG. 7 is a side plan view of the plug assembly 60 showing the plug 16 in the open position. In this design, the cover 18 has been replaced with a cover 62 having a conical configuration and the helical wound SMA device 30 has been replaced with a bow-string SMA device 64. This configuration of the cover 62 allows the bow-string type SMA device 64 to be connected at upper corners of the cover 62 to accommodate a bow-string operation. One end of the device 64 is attached to an upper attachment point of the cover 62 and an opposite end of the device 64 is attached to an opposite edge of the cover 62, where a middle point of the device 64 is attached to the attachment point 32. When the SMA device 64 is in its non-actuated state with no electrical current flow therethrough, shown in FIG. 6, the bias of the spring 24 forces the plug 16 into the hole 14. When the device 64 is heated by a flow of electrical current, its length is shortened due to the shape memory effect, which causes the plug 16 to move upward against the bias of the string 24 to open the hole 14.

FIG. 8 is a side plan view of a plug assembly 70 similar to the plug assembly 10, where like elements are identified by the same reference numeral, and where the plug 16 is in the closed position. FIG. 9 is a side plan view of the plug assembly 70 with the plug 16 in the open position. In this design, the plug assembly 70 includes a mechanical hinge 72 that attaches the plug 16 to the inside of a cover 78. The hinge 72 can be any device, or assembly of components, and be made of any material suitable for the purposes discussed herein. The hinge 72 flips from the closed position shown in FIG. 8 to the open position shown in FIG. 9, and back, when SMA devices 74 and 76 are actuated.

The SMA device 74 is a wire that includes one end attached to one side of the cover 78 and an opposite end attached to an opposite side of the cover 78, where a center part of the device 74 is securely mounted to a top end of the plug 16 in any suitable manner so that the device 74 has a general upward pointing configuration, as shown. Likewise, the SMA device 76 is a wire that includes one end attached to one side of the cover 78 and an opposite end attached to an opposite side of the cover 78, where a center part of the device 76 is securely mounted to the plug 16 at a central location so that the device 76 has a general downward pointing configuration, as shown. When the plug 16 is in the closed position, and it is desirable to open the drain hole 14, current is applied to the device 76, which causes it to contract and causes the hinge 72 to flip from the closed position to the open position. Once the plug 16 is in the open position, then the current to the device 76 is turned off. Likewise, when the plug 16 is in the open position and it is desirable to close the drain hole 14, current is applied to the SMA device 74, which causes it to contract and flip the hinge 72 to the closed position, where the plug 16 is positioned within the drain hole 14. Once the plug is in the closed position, then the current to the device 74 is turned off.

FIG. 10 is a side plan view of a plug assembly 80, which employs a straight wire SMA device 82. One end of the device 82 is attached to a first mounting structure 84 and an opposite end of the device 82 is attached to a plug 86. A return spring 88 is also attached to the plug 86 and a second mounting structure 90. When the SMA device 82 is not being actuated by a current flow, the bias of the return spring 88 causes the plug 86 to be positioned over a drain hole 92 so that it is closed. When current is applied to the SMA device 82, causing it to contract, the plug 86 slides away from the drain hole 92 against the bias of the return spring 88, as shown in FIG. 11.

Figure 12:
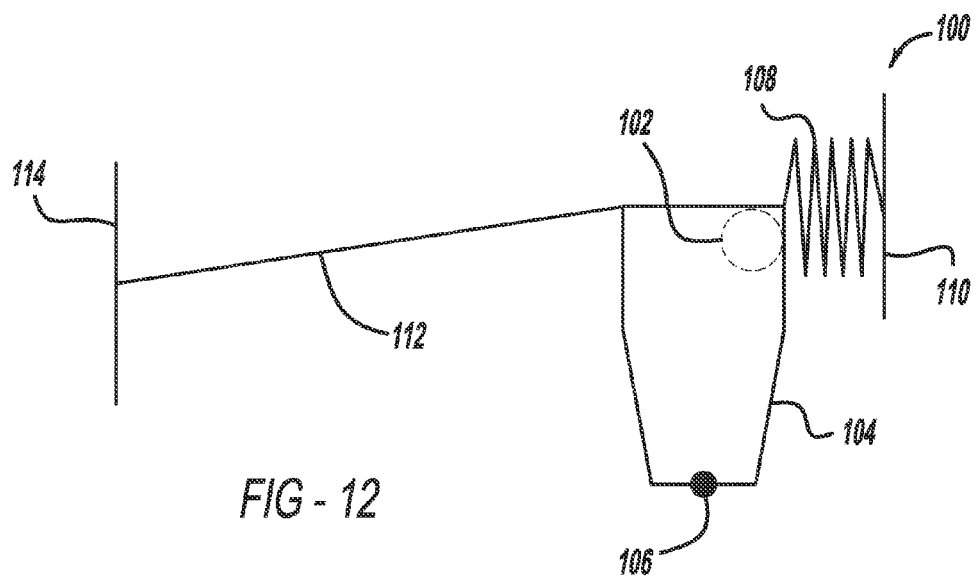
FIG. 12 is a side plan view of another plug assembly for sealing a drain hole where the plug is in the closed position.
Figure 13:
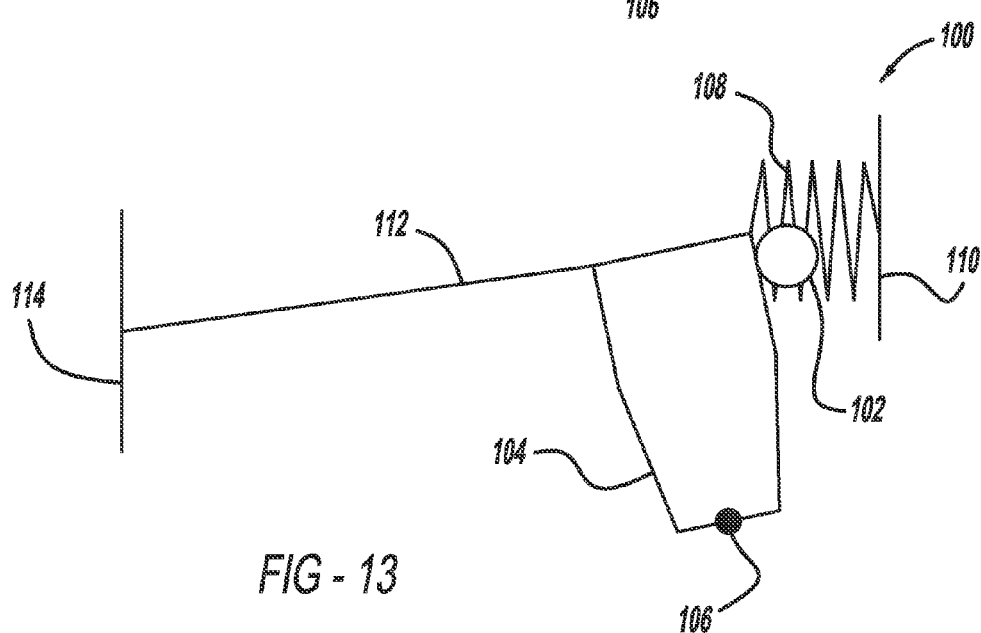
FIG. 13 is a side plan view of the plug assembly shown in FIG. 12 where the plug is in the open position.

FIG. 12 is a plan view of a plug assembly 100 that is also applicable to open and close a drain hole 102, such as a drain hole in a battery enclosure. The plug assembly 100 includes a plug 104 that is pivotally mounted to a suitable structure at a pivot point 106. A return spring 108 includes one end coupled to an opposite end of the plug 104 from the pivot point 106 and an opposite end to a support structure 110. The plug assembly 100 also includes a wire SMA device 112 having one end coupled to an end of the plug 104 opposite to the pivot point 106 and an opposite end mounted to an SMA device attachment structure 114. When the SMA device 112 is not actuated, the bias of the spring 108 causes the plug 104 to pivot at the pivot point 106 and close the drain hole 102. However, when it is desirable to open the drain hole 102, a current is applied to SMA device 112 causing it to shrink and pivot the plug 104 at the pivot point 106 to open the drain hole 102, as shown in FIG. 13.

The various plug assemblies discussed above can include a suitable controller (not shown) that automatically opens the drain hole 14 at a desirable time to drain any fluid out of the battery enclosure that may have accumulated therein. For example, the controller may determine that the vehicle is parked, the vehicle speed is zero and, for an electrical vehicle, determine that the battery is being charged. In this condition, it would be relatively safe to open the drain hole 14, where the controller may automatically provide current to any one of the SMA devices discussed above to cause the plug 16 to be put in the open position. Other control features may be employed, such as determining whether the vehicle is on a level plane through a level sensor. Further, to save complexity and cost of the controller, the plug assembly can be designed so that the SMA device is actuated whenever the vehicle is in charging using a simple circuit. The particular design may include a feature to only actuate the SMA device when the vehicle is charging and possibly pulse the SMA device when the vehicle starts to make sure the plug 16 is set properly.

In a more sophisticated design, suitable sensors can be provided to determine if fluid has accumulated in the enclosure, and if so, cause the SMA device to be activated to open the drain hole under certain conditions. The various plug assemblies can be designed to detect if the drain hole 14 is blocked using the SMA device which can detect overload conditions. Further, the SMA device may be able to detect that it is in a fluid environment as a result of its characteristics as opposed to being in air environment. Further, in freeze conditions, a trickle current can be provided to the SMA device to cause it and other elements to melt before it is actuated. Further, wicking cords can be employed to bring fluid from other places in the enclosure to the drain hole.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A plug assembly for opening and closing a drain hole, said plug assembly comprising:
   a plug that seals the drain hole when the plug is inserted into the drain hole;
   a cover covering the plug;
   a first shape memory alloy (SMA) wire having a first end attached to one side of the cover, a second end attached to an opposite side of the cover and a middle portion attached to the plug; and
   a second SMA wire having a first end attached to one side of the cover, a second end attached to an opposite side of the cover and a middle portion attached to the plug, wherein the first SMA wire is actuated to position the plug in a closed position to close the drain hole and the second SMA wire is actuated to position the plug in an open position to open the drain hole, and wherein the first and second SMA wires are actuated by applying a current to the wires.

2. The plug assembly according to claim 1 further comprising a mechanical hinge attached to the plug and the cover, said first SMA wire is actuated to flip the hinge to position the plug in the closed position and the second SMA wire is actuated to flip the hinge to position the plug in the open position.

3. The plug assembly according to claim 2 wherein the first SMA wire is attached to a top end of the plug and the second SMA wire is attached to a middle portion of the plug.

4. The plug assembly according to claim 1 wherein the cover includes at least one opening.

5. The plug assembly according to claim 1 wherein the plug and the drain hole are tapered.

6. The plug assembly according to claim 1 wherein the drain hole includes an anti-splash guard rim that extends down from the plug.

7. The plug assembly according to claim 1 wherein the drain hole is in an enclosure that houses a battery.

8. The plug assembly according to claim 7 where the battery is a high voltage battery for an electric vehicle.

9. A plug assembly for opening and closing a drain hole in an enclosure that houses a battery, said plug assembly comprising:
- a plug that seals the drain hole when the plug is inserted into the drain hole;
- a cover covering the plug;
- a first shape memory alloy (SMA) wire having a first end attached to one side of the cover, a second end attached to an opposite side of the cover and a middle portion attached to the plug;
- a second SMA wire having a first end attached to one side of the cover, a second end attached to an opposite side of the cover and a middle portion attached to the plug; and
- a mechanical hinge attached to the plug and the cover, wherein the first SMA wire is actuated to flip the hinge to position the plug in a closed position to close the drain hole and the second SMA wire is actuated to flip the hinge to position the plug in an open position to open the drain hole, and wherein the first and second SMA wires are actuated by applying a current to the wires.

10. The plug assembly according to claim 9 wherein the first SMA wire is attached to a top end of the plug and the second SMA wire is attached to a middle portion of the plug.

11. The plug assembly according to claim 9 wherein the cover includes at least one opening.

12. The plug assembly according to claim 9 wherein the plug and the drain hole are tapered.

13. The plug assembly according to claim 9 wherein the drain hole includes an anti-splash guard rim that extends down from the plug.

14. The plug assembly according to claim 9 where the battery is a high voltage battery for an electric vehicle.

15. A plug assembly for opening and closing a tapered drain hole in an enclosure that houses a high voltage battery for an electric vehicle, said plug assembly comprising:
- a tapered plug that seals the drain hole when the plug is inserted into the drain hole, wherein the drain hole includes an anti-splash guard rim that extends down from the plug;
- a cover covering the plug;
- a first shape memory alloy (SMA) wire having a first end attached to one side of the cover, a second end attached to an opposite side of the cover and a middle portion attached to the plug;
- a second SMA wire having a first end attached to one side of the cover, a second end attached to an opposite side of the cover and a middle portion attached to the plug; and
- a mechanical hinge attached to the plug and the cover, wherein the first SMA wire is actuated to flip the hinge to position the plug in a closed position to close the drain hole and the second SMA wire is actuated to flip the hinge to position the plug in an open position to open the drain hole, and wherein the first and second SMA wires are actuated by applying a current to the wires.

16. The plug assembly according to claim 15 wherein the first SMA wire is attached to a top end of the plug and the second SMA wire is attached to a middle portion of the plug.

17. The plug assembly according to claim 15 wherein the cover includes at least one opening.

* * * * *